(12) United States Patent
Soulier

(10) Patent No.: US 6,404,350 B1
(45) Date of Patent: Jun. 11, 2002

(54) DEVICE FOR PROVIDING AN ELECTRICALLY INSULATED CONNECTION BETWEEN TWO METAL ELEMENTS

(75) Inventor: Louis Soulier, Sannois (FR)

(73) Assignee: Geoservices, Le Blanc Mesnil (FR)

( * ) Notice: Subject to any disclaimer, the term of this patent is extended or adjusted under 35 U.S.C. 154(b) by 0 days.

(21) Appl. No.: 09/269,785

(22) PCT Filed: Jul. 31, 1998

(86) PCT No.: PCT/FR98/01705

§ 371 (c)(1),
(2), (4) Date: Apr. 1, 1999

(87) PCT Pub. No.: WO99/08035

PCT Pub. Date: Feb. 18, 1999

(30) Foreign Application Priority Data

Aug. 4, 1997 (FR) .......................................... 97 10059

(51) Int. Cl.[7] ................................................ G01V 1/00
(52) U.S. Cl. ................................ 340/854.4; 340/854.6; 367/82
(58) Field of Search ......................... 340/854.6, 854.4, 340/854.5, 854.8; 367/81, 82; 324/338, 342

(56) References Cited

U.S. PATENT DOCUMENTS

| 4,601,493 | A | * | 7/1986 | Ross .............................. 285/53 |
| 4,785,247 | A | * | 11/1988 | Meador ....................... 324/338 |
| 5,130,706 | A | * | 7/1992 | Van Steenwyk ......... 340/854.6 |
| 5,394,141 | A | * | 2/1995 | Soulier .................... 340/854.4 |
| 5,749,605 | A | * | 5/1998 | Hampton ...................... 285/48 |
| 5,942,990 | A | * | 8/1999 | Smith ....................... 340/853.7 |
| 6,177,882 | B1 | * | 1/2001 | Ringgenberg et al. ... 340/853.7 |
| 6,209,632 | B1 | * | 4/2001 | Holbert et al. ............. 166/65.1 |

* cited by examiner

Primary Examiner—Michael Horabik
Assistant Examiner—Albert K. Wong
(74) Attorney, Agent, or Firm—Antonelli, Terry, Stout & Kraus, LLP

(57) ABSTRACT

The present invention relates to a device for connecting two metal parts. The device comprises a first element (1) having a female conical surface and a second element (5) having a male conical surface, at least one of the two surfaces being coated with a thin layer (12) of an electrically insulating material. The two elements (1, 5) are inserted one inside the other so that they are mechanically joined and electrically insulated.

37 Claims, 1 Drawing Sheet

DEVICE FOR PROVIDING AN ELECTRICALLY INSULATED CONNECTION BETWEEN TWO METAL ELEMENTS

BACKGROUND OF THE INVENTION

1. Field of the Invention

The present invention relates to a device for proving a connection between two metal elements so as to electrically insulate the two elements, which are generally substantially tubular in shape.

2. Description of the Prior Art

In the field of petroleum exploration and exploitation, electromagnetic transmissions are often used when drilling a bore, requiring the use of an antenna comprising two tubular parts which are mechanically joined to one another but electrically insulated. It is therefore necessary to use a connector which provides electrical insulation but which is also resistant to twisting, bending, traction and compression, depending on the stresses to which the tubular elements of a drill string, a string of production tubes or a production test drill string might be subjected.

Document U.S. Pat. No. 5,163,714 describes a connector which can fulfill this function but its mechanical strength is limited, in particular by the strength of the epoxy resin used for bonding and by the reduced thicknesses of the male and female components. Furthermore, the technical solution chosen requires the connector to be of a considerable length, which does not render its use particularly easy in a bore, nor does it facilitate the method of manufacture thereof. At the same time, in view of the fact that the resin must be capable of withstanding a higher temperature, i.e. in excess of 130° C., it is necessary to use a very expensive resin and one which is very delicate to work with.

SUMMARY OF THE INVENTION

The present invention provides a solution to the problem of the prior art, in particular one which is less expensive to make, requires a smaller connector length and has a mechanical strength which can be more readily optimized.

Accordingly, the invention relates to a device for providing a connection between two metal parts. The device is a first element with a female, conical surface and a second element having a male, conical surface. At least one of the two surfaces is coated with a thin layer of an electrically insulating material. The two elements are inserted one inside the other so that they can be mechanically joined.

The second element may be coated with the thin layer, this layer having a controlled surface state and possibly being modified.

The layer may be of a thickness ranging between 0.1 and 0.5 mm and preferably between 0.2 and 0.4 mm and may be made from a ceramic type material.

Seals may be placed substantially at the two ends of the thin layer in order to prevent penetration by any fluid between the two conical surfaces.

The incline of the conical surface may have an angle ranging between 1 and 2° and preferably between 1.3 and 1.5°.

A third element may be joined to the second element and may come into contact with the first element by means of at least one electrically insulating ring.

The ring may have seals to provide a tight contact between the first element and the third element.

A thin layer of electrical insulation material over at least a part of the surfaces which are in contact with the ends of the first and third element may be provided.

The invention also relates to an application of forming a dipole of an antenna for transmitting or receiving electromagnetic waves.

By preference, the invention forms a dipole in a drill string, a production test drill string or casing tubes or tubing.

BRIEF DESCRIPTION OF THE DRAWINGS

The invention will be more readily understood and its advantages will become clearer from the following description of an embodiment, which is not restrictive in any respect, illustrated by the appended drawings, in which.

DESCRIPTION OF THE PREFERRED EMBODIMENTS

Figure 1:
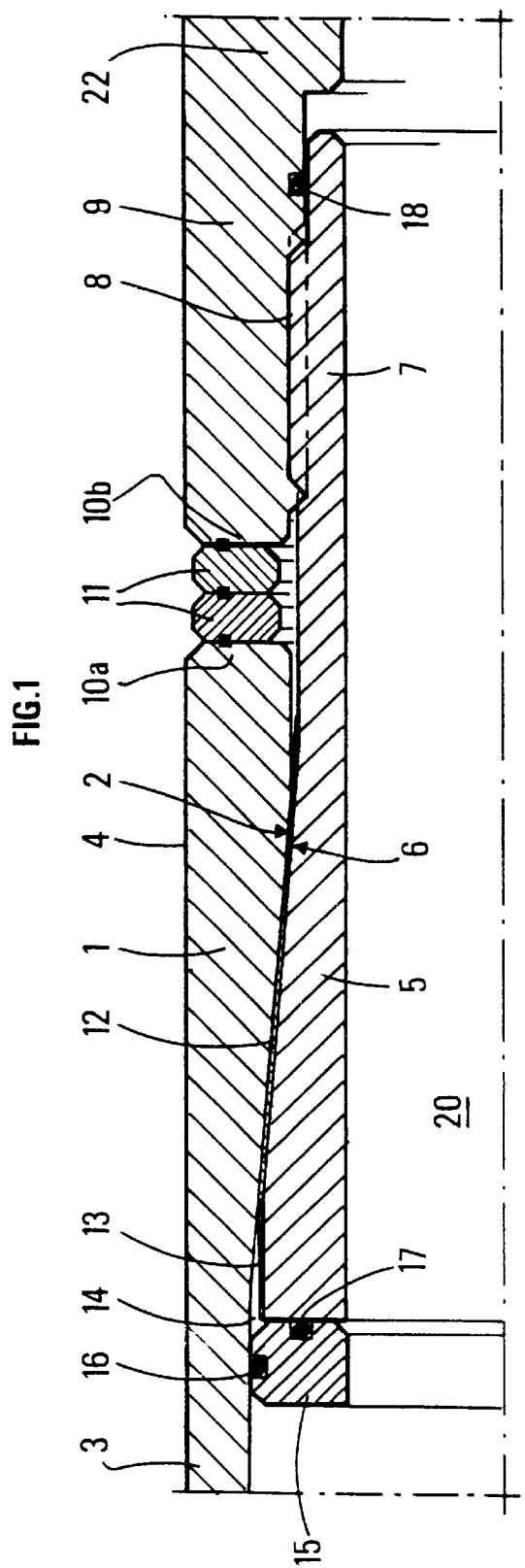
FIG. 1 is a schematic illustration, in partial section, of a connector in accordance with the invention.

The jointing piece 1 (referred to as the female part) has a string of tubes or rods connected to one of its ends 3 by means of a conventional connection (not illustrated here), for example threading. The internal surface 2 of the part 1 is conical across a certain part of its length. The external surface 4 is generally cylindrical, as are most of the elements screwed to an assembly of tubes designed to be lowered into a well bore.

A second jointing piece 5 (referred to as the male part), located inside the piece 1, has an external surface 6 with a conical geometry matching the internal surface 2 of the part 1. The end 7 of the part 5 is substantially cylindrical and has a thread 8 so that the part 5 can be assembled with a linking part 9 having at one end 22 another connector which provides a mechanical connection with the assembly of tubes. This connection, not illustrated here, may be any known device used to provide a mechanical link between tubes, for example a conical thread.

Figure 1A:
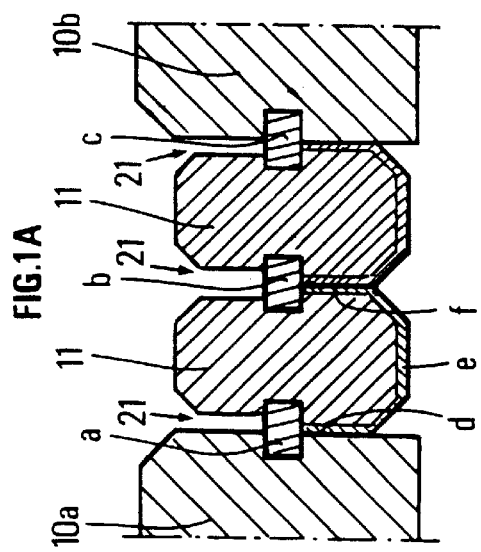
FIG. 1A is a schematic illustration showing a detail of components of the connector.

Inserted between the end 10a (opposite the end 3) of the piece 1 and the end 10b of the piece 9 (opposite the end 22) is a series of rings 11, at least three faces d, e and f of which (FIG. 1A) are coated with a layer of insulating material, for example ceramic with a given electrical insulation characteristic capable of withstanding high temperatures. O-rings a, b and c (FIG. 1A) are placed between each jointing plane defined by the stack of rings 11 between the end 10a of the piece 1 and the end 10b of the piece 9. The jointing planes of the rings 11 are recessed by several tenths of a millimeter at their surface located on the exterior of the seals a, b, c so that there is sufficient clearance 21 to prevent electrical contact between the different surfaces of the jointing planes. In effect, these parts located on the exterior can not be isolated from the external fluid and abrasion. These external surfaces can therefore not be electrically insulated by a layer of coating. The spaces 21 are determined such that the insulation, which may not be perfect, between the ends 10a and 10b is nevertheless sufficient for this connector to be used to manufacture an antenna that will receive and transmit electromagnetic waves, for example.

A coating 12 is applied to at least one of the conical surfaces 6 and 2 using a hard, electrical insulation material, for example ceramic. By preference, an alumina (approximately 97%) and titanium oxide (approximately 3%) based ceramic is deposited by plasma arc techniques.

In order to avoid any major leakages or electrical short circuits between the jointing pieces 1 and 5, the end 13 of the jointing piece 5 is, machined so as to be recessed relative to the internal surface of the piece 1, one of the two facing surfaces spaced back by a clearance 14 being coated with the same insulating material 12. Clearly, the clearance 14 may be produced by a different form of machining than that illustrated in the drawing but which will fulfill the same function.

A ring 15 made from a non-conductive material is used as an O-ring seat for the seals 16 and 17 without establishing an electrical link between the two jointing piece 1 and 5. The ring 15 may be fixed onto at least one of the parts 5 or 1 by any known mechanical means, for example, a threaded ring screwed onto a female thread machined in the internal bore of the piece 1.

At the other end 7 of the piece 5, close to the threading 8 linking part 5 to the linking part 9, an O-ring 18 is placed in a matching groove.

Clearly, it would not be a departure from the scope of this invention if a different number and/or type of joints were used at each level or sealing plane.

Consequently, the parts 3 and 9 are electrically insulated by the presence of the coating 12, the insulating rings 11 and the clearance 14.

Due to the porosity of the layers of insulating ceramic and in order to prevent corrosion of the ceramic jointing surfaces, they must be isolated from the fluids present inside or outside the tubular elements, i.e. the well fluid if used in the field of exploring and exploiting well deposits, and the fluid circulating in the interior space 20 of the tubes and hence also inside the insulating connector of the invention. The function of the O-rings a, b and c (FIG. 1A) is to seal the connector from the external fluid and that of the O-rings 16, 17 and 18 to seal the connector from the internal fluid.

In addition to protecting the ceramic coating, it is necessary to prevent well fluids from penetrating the assemblies.

The connector is assembled and manufactured in the following way, for example:

the part 5 is made by machining and is then coated, using conventional techniques with a layer of ceramic 12, optionally correcting the surface state of the coating 12 so that the contact surface is optimal without risk of the coating tearing;

in certain instances, an additional treatment may be applied in order to modify and generally increase the friction coefficient between the two conical pieces. This will increase the torque transmitted by the cones and reduce the compressive bearing strain on the conical surface.

the part 5 is inserted inside the part 1, applying a given tensile stress between the two parts. The assembly stress is determined as a function of the mechanical strength of the connector, given the nature of the materials and the sections of metal used;

the stack of insulating rings 11 is positioned and the part 9 is screwed down so that it locks abutting the rings in order to contain the compressive force during service, for example a load on the packer (sealing member in a well) during test production (TDS) or due to the weight on the bit during drilling;

the inner ring 15 is positioned to provide the internal seal.

It is clear that the traction force on such a connector will be borne by force of the co-operation of the male cone in the female cone while compressive strain will essentially be borne by the ends 10a, 10b and the rings 11, while twisting strain will essentially be absorbed by the friction of the cones 2 and 6.

By preference, it is the male cone 6 of the jointing piece 5 that is coated with the layer of ceramic, approximately 0.2 to 0.4 mm in thickness, by plasma arc deposition. In effect, this being the case, it is easier to correct the conical surface 6 so that the geometry of the coating is sufficiently good to promote adjustment between the male cone and the female cone. By preference, the incline of the cones 2 and 6 ranges between 1° and 2° and in particular between 1.3° and 1.5°. The conical gradient value will depend on the mechanical performance required of the connector, particularly in terms of traction and torque.

In the case where the insulating connector proposed by the invention is used in a test drill string (TDS), the connector proposed by the invention will have the following specifications, for example:

External diameter: 127 mm (5 inches)
Internal diameter: 66 mm
Length of insulated region: approximately 175 mm
Max. traction: at least 160 t
Max. compression: at least 160 t
Max. torque: 7200 daN.m
Internal service pressure: at least 103 MPa (15000 psi)
External service pressure: at least 103 MPa (15000 psi)

The present invention is not restricted to the use of ceramic, cited as an example here. In practice, any insulating material may be used as a coating, applied in a thin layer on a metal piece. However, its friction coefficient must be high enough to transmit the mechanical stress from the lower part to the upper part and its compression strength must be such that it can withstand the contact forces between the conical parts inserted one inside the other. Clearly, the electrical insulation provided by the thin layer must be such as to permit use in an antenna for transmitting or receiving electromagnetic waves.

The present invention may be applied in making an antenna for electromagnetic transmission of the type described in U.S. Pat. No. 5,394,141, cited here as a reference. This antenna may be inserted in an assembly of rods or drill string, in a tube assembly for production testing during or after drilling, or in an assembly of casing tubes, to transmit data picked up by down-hole sensors.

What is claimed is:

1. A device for providing a connection between two metal parts in a drill string, a production test drill string, casing tubes or tubing, comprising:

a first metal element including a female continuously straight conical surface;

a second metal element including a continuously straight male conical surface with at least one of the two conical surfaces being coated with a layer of an electrical insulation material; and wherein the first and second metal elements are coupled by inserting the second metal element into the first metal element to provide a mechanical joint at least between the male and female conical surfaces while being electrically insulated and traction on the mechanical joint causing the conical surfaces to press against each other to provide a frictional coupling therebetween.

2. A device as claimed in claim 1 wherein:

only the continuously straight conical surface of the second metal element is coated with the layer, the layer having a surface which is treated to provide the frictional coupling.

3. A device as claimed in claim 1, wherein:

the layer is of a thickness ranging between 0.1 and 0.5 mm.

4. A device as claimed in claim 3 wherein:

the thickness ranges between 0.2 and 0.4 mm and the layer is a ceramic material.

5. A device as claimed in claim 2 wherein:

the layer is of a thickness ranging between 0.1 and 0.5 mm.

6. A device as claimed in claim 5 wherein:

the thickness ranges between 0.2 and 0.4 mm and the layer is a ceramic material.

7. A device as claimed in claim 1, comprising:

seals positioned substantially at two ends of the layer which prevent fluid from penetrating between the two conical surfaces.

8. A device as claimed in claim 2, comprising:

seals positioned substantially at two ends of the layer which prevent fluid from penetrating between the two conical surfaces.

9. A device as claimed in claim 3, comprising:

seals positioned substantially at two ends of the layer which prevent fluid from penetrating between the two conical surfaces.

10. A device as claimed in claim 4, comprising:

seals positioned substantially at two ends of the layer which prevent fluid from penetrating between the two conical surfaces.

11. A device as claimed in claim 5, comprising:

seals positioned substantially at two ends of the layer which prevent fluid from penetrating between the two conical surfaces.

12. A device as claimed in claim 6, comprising:

seals positioned substantially at two ends of the layer which prevent fluid from penetrating between the two conical surfaces.

13. A device as claimed in claim 1, wherein:

an inclination of the conical surfaces has an angle ranging between 1° and 2°.

14. A device as claimed in claim 2, wherein:

an inclination of the conical surfaces has an angle ranging between 1 and 2°.

15. A device as claimed in claim 3, wherein:

an inclination of the conical surfaces has an angle ranging between 1° and 2°.

16. A device as claimed in claim 4, wherein:

an inclination of the conical surfaces has an angle ranging between 1° and 2°.

17. A device as claimed in claim 5, wherein:

an inclination of the conical surfaces has an angle ranging between 1° and 2°.

18. A device as claimed in claim 6, wherein:

an inclination of the conical surfaces has an angle ranging between 1° and 2°.

19. A device as claimed in claim 7, wherein:

an inclination of the conical surfaces has an angle ranging between 1° and 2°.

20. A device as claimed in claim 8, wherein:

an inclination of the conical surfaces has an angle ranging between 1° and 2°.

21. A device as claimed in claim 9, wherein:

an inclination of the conical surfaces has an angle ranging between 1° and 2°.

22. A device as claimed in claim 10, wherein:

an inclination of the conical surfaces has an angle ranging between 1° and 2°.

23. A device as claimed in claim 11, wherein:

an inclination of the conical surfaces has an angle ranging between 1° and 2°.

24. A device as claimed in claim 12, wherein:

an inclination of the conical surfaces has an angle ranging between 1° and 2°.

25. A device as claimed in claim 1, comprising:

at least one ring; and wherein the at least one ring contacts the first element and the third element and provides electrical insulation therebetween.

26. A device as claimed in claim 2, comprising:

at least one ring; and wherein the at least one ring contacts the first element and the third element and provides electrical insulation therebetween.

27. A device as claimed in claim 3, comprising:

at least one ring; and wherein the at least one ring contacts the first element and the third element and provides electrical insulation therebetween.

28. A device as claimed in claim 7, comprising:

at least one ring; and wherein the at least one ring contacts the first element and the third element and provides electrical insulation therebetween.

29. A device as claimed in claim 13, comprising:

at least one ring; and wherein the at least one ring contacts the first element and the third element and provides electrical insulation therebetween.

30. A device as claimed in claim 25, wherein:

the at least one ring has a layer of electrical insulation on at least a part of a surface which contact ends of the first and third elements.

31. A device as claimed in claim 26, wherein:

the at least one ring has a layer of electrical insulation on at least a surface part thereof which layer contact ends of the first and third elements.

32. A device as claimed in claim 27, wherein:

the at least one ring has a layer of electrical insulation on at least a surface part thereof which layer contact ends of the first and third elements.

33. A device as claimed in claim 28, wherein:

the at least one ring has a layer of electrical insulation on at least a surface part thereof which layer contact ends of the first and third elements.

34. A device as claimed in claim 29, wherein:

the at least one ring has a layer of electrical insulation on at least a surface part thereof which layer contact ends of the first and third elements.

35. A device as claimed in claim 25 comprising:

a mechanical coupling between an outer surface of the second metal element and an inner surface of the third element.

36. A device in accordance with claim 35 wherein:

the mechanical coupling is a threaded connection.

37. A device in accordance with claim 1 wherein:

the connection is part of an antenna which transmits or receives electromagnetic waves.

* * * * *